Inventor
Louie Baldo

UNITED STATES PATENT OFFICE 2,494,538

WINDOW WIPER APPARATUS

Louie Baldo, United States Navy

Application October 10, 1945, Serial No. 621,629

5 Claims. (Cl. 74—79)

(Granted under the act of March 3, 1883, as amended April 30, 1928; 370 O. G. 757)

The invention relates to improvements in window wiper apparatus and relates more particularly to a window wiper for use in cleaning the outer surface of aircraft windshields particularly during flight in rain, fog, snow, and icing conditions but is applicable to ships, boats, trains and other vehicles.

An object of the invention is the provision of a window wiper apparatus including novel and effective means for adjusting the extent of the arc of travel of the wiper arm from without the wiper unit.

A further object is to provide a window wiper apparatus which makes it possible to use the same window unit on practically all aircraft.

Another object of the invention is the provision of a window wiper apparatus incorporating a quick return mechanism providing greater torque on the up-wind stroke than on the down-wind stroke, and thus materially reducing the power required to drive the unit.

Other objects and advantages of the invention will be more apparent from the following description taken in connection with the accompanying drawings, which are exemplary, and in which.

Figure 1:
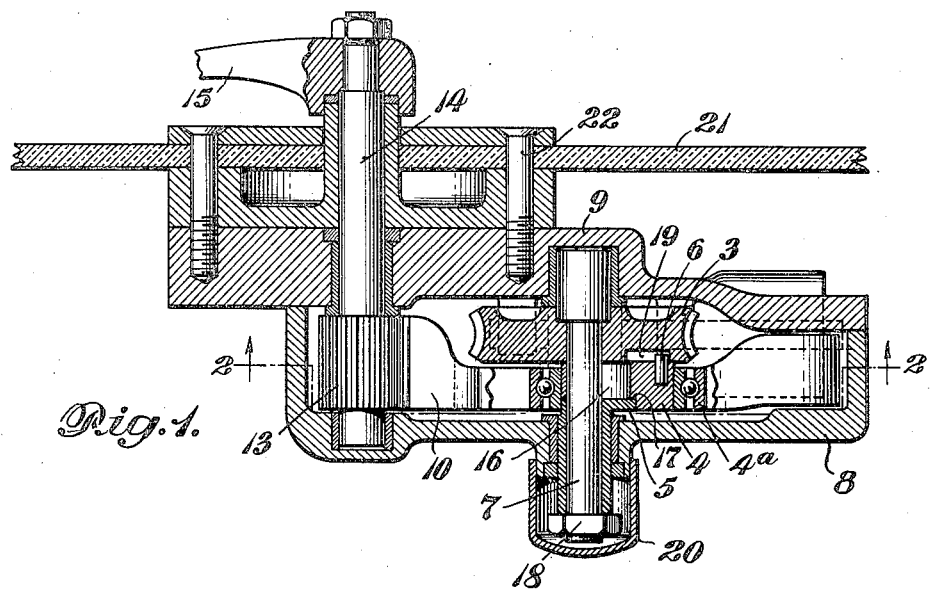
Fig. 1 is a sectional view of a device embodying the invention, taken substantially on the line 1—1 of Fig. 2.

Referring to the drawings, the numeral 1 represents a shaft driven by a suitable means such as an electric motor (not shown). A worm 2 is keyed or otherwise secured to the shaft 1 and drives the worm wheel 3, which in turn drives outer eccentric 4 and its associated inner eccentric 5 by means of a connection comprising a key or pin 6.

The worm gear or wheel 3 and the eccentrics 4 and 5 are all mounted on the shaft 7 which desirably rotates in suitable bearings in housing sections 8 and 9.

The eccentric 4 includes an outer ball race portion 4a, which is pressed or driven over the body of the eccentric 4, and forms a part thereof.

The eccentric 4 with its outer bearing portion 4a in engagement with the sides of yoke 10, oscillates the yoke member 10 about its pivot 11, as the eccentric rotates, driven by the worm wheel 3 through key 6.

Rack 12 on the oscillating yoke 10 drives pinion or gear 13 on the wiper shaft 14 to operate the arm 15 carrying the wiper blade (not shown).

The eccentric 4 is provided with an opening 16 therein and providing an annular shoulder 17 which desirably is provided with serrations.

Received within the opening 16 and against the serrated shoulder 17 of the eccentric 4, is the eccentric 5, desirably having an annular serrated portion on its face for positive engagement with the serrated shoulder 17 of eccentric 4. If desired the annular shoulder 17 and the cooperating annular portion of the eccentric 5 may be angular or inclined providing conical contacting surfaces for positive engagement therebetween, with or without serrations. The eccentric 5 desirably includes a tubular portion receiving the shaft 7.

The shaft 7 passes through the opening in eccentric 5 and through the opening 16 in eccentric 4, and through the worm wheel 3 which is suitably secured to the shaft.

A nut 18 is threaded on the end of the shaft 7 and serves to clamp the eccentric 5 against the shoulder 17 of the eccentric 4, with the serrations in engagement to prevent slippage between the eccentrics 4 and 5 in the operation of the device.

Preferably the opening 19 in the worm wheel 3, which receives the pin or key 6 extending from the eccentric 4, is in the form of a radially elongated slot in the said worm wheel.

To adjust the stroke of the wiper arm 15 by the mechanism as described, the cap 20 is removed, the nut 18 is loosened, permitting disengagement of the serrated connection by slight withdrawal of the eccentric 5 sufficient to enable it to be rotated within the eccentric 4.

Rotation of the cam or eccentric 5 within the eccentric 4 varies the eccentricity of the eccenric 4 in relation to the worm wheel 3 and shaft 7, thereby controlling the extent of movement of the yoke 10 and the stroke of the wiper arm.

Figure 2:
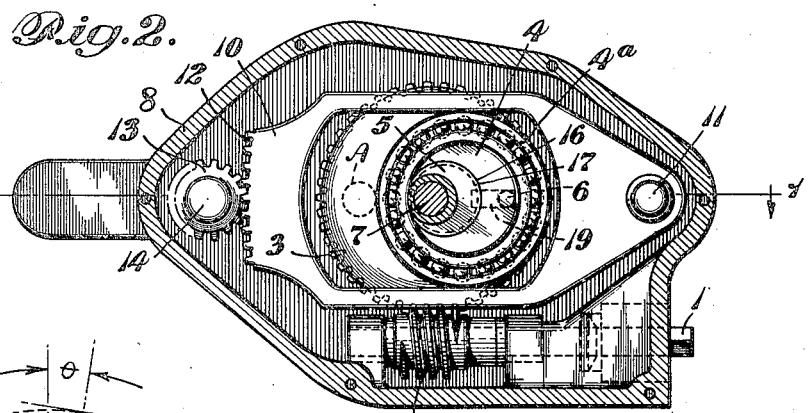
Fig. 2 is a view partly in section of the device of Fig. 1, substantially on the line 2—2 of Fig. 1.

This adjustment or movement of the position of the yoke-operating eccentric 4 in relation to the worm wheel 3, upon rotation of the eccentric 5 therein, is permitted by the radial slot 19 in the worm wheel 3 and by the opening 16 in the eccentric 4 which is considerably larger than the shaft 7 passing therethrough. As the eccentric 5 is rotated, it causes a swinging movement of the eccentric 4 about the pin 6, together with a simultaneous shifting movement of the eccentric 4 as its pin 6 moves along the radial slot 19, thus changing the position of eccentric 4 in relation to the worm wheel 3 and in relation to the shaft 7. If the eccentric 5 were rotated through a complete revolution about the shaft 7, the outer end of the eccentric 4 and its key or pin 6 would move back and forth radially in the radial slot 19, while the inner end of the eccentric 4 would describe a circle A. substantially as indicated in dotted lines in Fig. 2.

In the position of the parts as shown in the drawings, the adjustment of the eccentrics is such that the maximum stroke of the wiper results. In this adjusted position of the eccentrics, both eccentrics extend in the same direction, i. e., to the right in Figs. 1 and 2.

In the adjustment of the eccentrics for the minimum stroke of the yoke 10 and consequently of the wiper arm, the inner eccentric 5 is rotated to a position opposite to the position shown, in relation to the shaft 7, so that the center of the main eccentric 4 approaches the center of the shaft 7. With the structure and arrangement as shown, the center of the main eccentric 4 will coincide with the center of the shaft 7 at the minimum position, so that there will be zero eccentricity of the eccentric 4 and zero stroke of the wiper, although it is not necessary that these centers be made to coincide at the minimum position, and the invention is not limited to the arrangement shown.

In an aircraft windshield installation, for example, a unit as shown in the drawings may desirably be provided for each windshield, being secured to the windshield 21 by suitable means 22.

The units desirably may be driven by a single electrical motor through suitable shafting and gearing (not shown) or by individual motors, rotating the shaft 1 of the unit.

The provision of the readily accessible clamping nut 18 and the adjusting cam or eccentric mechanism, provides for ready adjustment of the extent of the arc of travel or stroke of the wiper arm from without the wiper unit. This feature makes it possible to use the same window unit on practically all aircraft.

Figure 3:
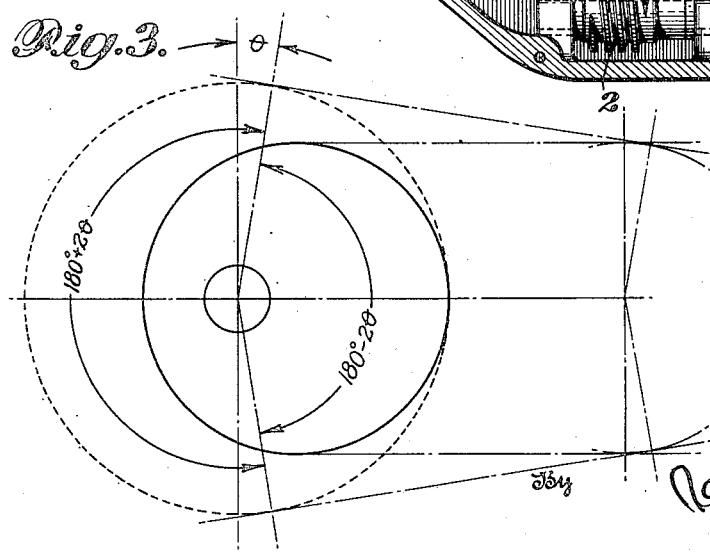
Fig. 3 is a diagram showing that a quick return mechanism is provided providing greater torque on the up-wind stroke than on the down-wind stroke.

Referring to Fig. 3, the invention provides a quick return mechanism, providing greater torque on the up-wind stroke than on the down-wind stroke, thereby materially reducing the power required to drive the unit. Aircraft windshields generally are mounted to slant rearwardly from either side of the center, and the wiper unit of the present invention may be mounted either at the top or bottom of the rearwardly slanting windshields, so that they have a forward or up-wind stroke and a rearward or down-wind stroke.

Since the cam or eccentric 4 rotates at constant speed, the time required for the up-wind stroke is $$(180+2\theta) \div 360 \times 1/C.\ P.\ M.$$

and the time required for the down-wind stroke is $$(180-2\theta) \div 360 \times 1/C.\ P.\ M.$$

Therefore, the minimal torque on the up-wind stroke will be greater than the minimal torque on the down-wind stroke.

Although but one embodiment of the invention is herein shown and described, it will be understood that various changes in the size, shape, and arrangement of parts may be made without departing from the spirit of the invention and it is not intended to limit the invention other than by the terms of the appended claims.

The invention described herein may be manufactured and used by or for the Government of the United States of America for governmental purposes without the payment of any royalties thereon or therefor.

What is claimed is:

1. An apparatus of the class described comprising, in combination, a shaft, a wheel on said shaft, means for driving said wheel, an outer eccentric adjacent said wheel and having an opening substantially larger than the diameter of the shaft and through which the shaft extends, an inner eccentric on said shaft having an opening of a diameter receiving said shaft, said outer eccentric receiving a portion of said inner eccentric in said opening for adjustment thereby and providing a substantially annular shoulder for locking engagement with said inner eccentric, said inner eccentric having a sleeve or tubular portion extending over said shaft, said shaft having a threaded outer end with a locking nut thereon to engage the end of the sleeve of said inner eccentric to lock the eccentrics in adjusted position, and means slidably connecting said outer eccentric with said wheel to permit movement of said outer eccentric radially of said wheel, a pivoted yoke embracing said outer eccentric and oscillated thereby, and means operatively connected to said yoke to be driven thereby.

2. An apparatus of the class described comprising, in combination, a housing, a shaft mounted in said housing, a worm wheel on said shaft, a worm and drive shaft for driving said worm wheel, an outer eccentric on said shaft adjacent said worm wheel and having an opening substantially larger than the diameter of the shaft and through which the shaft extends, an inner eccentric having a tubular portion and having an opening of a diameter receiving said shaft, said outer eccentric receiving a portion of said inner eccentric in its said opening for adjustment thereby and providing a substantially annular shoulder for locking engagement with said inner eccentric, said shaft having a threaded outer end with a locking nut thereon to engage the end of the tubular portion of the inner eccentric to lock the eccentrics in adjusted position, and means comprising a pin and radial slot connection slidably connecting said outer eccentric with said wheel to permit movement of said outer eccentric radially of said wheel, a pivoted yoke embracing said outer eccentric and oscillated thereby, and means operatively connected to said yoke to be driven thereby.

3. An apparatus of the class described comprising, in combination, a housing, a shaft in said housing, a wheel on said shaft, means for driving said wheel, a circular outer eccentric on said shaft adjacent said wheel and having a substantially circular opening substantially larger than the diameter of the shaft and through which the shaft extends, a circular inner eccentric having a tubular extension and having an opening of a diameter receiving said shaft, said outer eccentric receiving a portion of said inner eccentric in its said opening for adjustment thereby and providing a substantially annular shoulder for locking engagement with said inner eccentric, said shaft having a threaded outer end with a locking nut thereon to engage the end of the tubular extension of the inner eccentric to lock the eccentrics in adjusted position, and means slidably connecting said outer eccentric with said wheel to permit movement of said outer eccentric radially of said wheel, a pivoted yoke embracing said outer eccentric and oscillated thereby, and means operatively connected to said yoke to be driven thereby.

4. An apparatus of the class described comprising, in combination, a housing, a shaft in said housing, a wheel on said shaft, means for driving said wheel, a circular outer eccentric on said shaft adjacent said wheel and having a substantially circular opening substantially larger than the diameter of the shaft and through which the shaft extends, a circular inner eccentric having a tubular extension and having an opening of a diameter receiving said shaft, said outer eccentric receiving a portion of said inner eccentric in its said opening for adjustment thereby and providing a substantially annular shoulder for locking engagement with said inner eccentric, said shaft having a threaded outer end with a locking nut thereon to engage the end of the tubular extension of the inner eccentric to lock the eccentrics in adjusted position, and means slidably connecting said outer eccentric with said wheel to permit movement of said outer eccentric radially of said wheel, a pivoted yoke embracing said outer eccentric and oscillated thereby, means operatively connected to said yoke to be driven thereby, said apparatus providing greater torque on one stroke thereof than on the other stroke, and a quick return action.

5. An apparatus of the class described comprising, in combination, a housing, a shaft in said housing, a worm wheel on said shaft, a worm and drive shaft for driving said worm wheel, a circular outer eccentric on said shaft adjacent said worm wheel and having a substantially circular opening substantially larger than the diameter of the shaft and through which the shaft extends, a circular inner eccentric having a tubular extension and having an opening of a diameter receiving said shaft, said outer eccentric receiving a portion of said inner eccentric in its said opening for adjustment thereby and providing a substantially annular shoulder for locking engagement with said inner eccentric, said annular shoulder and inner eccentric having cooperating serrations thereon, said shaft having a threaded outer end with a locking nut thereon to engage the end of the tubular extension of the inner eccentric to lock the eccentrics in adjusted position, said worm wheel having a radial slot therein, a pin in said outer eccentric slidably received in said radial slot to permit movement of said outer eccentric radially of said wheel, said outer eccentric including an outer ball race portion pressed or driven thereover, a pivoted yoke embracing said outer eccentric and oscillated thereby, and means operatively connected to said yoke to be driven thereby.

LOUIE BALDO.

REFERENCES CITED

The following references are of record in the file of this patent:

UNITED STATES PATENTS

| Number | Name | Date |
|---|---|---|
| 1,585,442 | Vernet | May 18, 1926 |
| 2,326,231 | Kraemer | Aug. 10, 1943 |
| 2,376,010 | Sacchini et al. | May 15, 1945 |